United States Patent Office 3,657,203
Patented Apr. 18, 1972

3,657,203
SYNTHETIC HYDROCARBON ELASTOMERS
HAVING IMPROVED BUILDING TACK
Robert Edward Tarney, Hockessin, and John J. Verbanc, Wilmington, Del., assignors to E. I. du Pont de Nemours and Company, Wilmington, Del.
No Drawing. Continuation-in-part of application Ser. No. 29,645, Apr. 17, 1970. This application Dec. 11, 1970, Ser. No. 97,319
Int. Cl. C08f 17/00
U.S. Cl. 260—5
18 Claims

ABSTRACT OF THE DISCLOSURE

Synthetic hydrocarbon elastomers are tackified by uniformly dispersing therein an N,N'-disubstituted-p-arylene diamine, a 1,2-dihydro-2,2,4-trialkyl quinoline, 1,4-di-2,4-cyclopentadien-1-yl-butene or a diester of 5-norbornene-2-methanol and a dicarboxylic acid, and exposing the resulting mixture to a greater than ambient concentration of ozone or to ultraviolet light in the presence of oxygen. Optionally, the elastomer can contain selected resins uniformly dispersed therein which enhance the generation and retention of building tack.

PRIORITY

This application is a continuation-in-part of copending application Ser. No. 29,645, filed Apr. 17, 1970.

BACKGROUND OF THE INVENTION

This invention relates to compounding synthetic hydrocarbon elastomers. More particularly, this invention relates to promoting building tack in such elastomers.

The term "building tack" (sometimes referred to simply as "tack") is used herein with its usual meaning as the peculiar characteristic of uncured natural rubber which causes two fresh surfaces to adhere or coalesce when brought into contact under moderate pressure at ambient temperatures. Tackified elastomers are required in manufacturing multilayered elastomeric products such as belts, hoses, tires and reservoir liners. Uncured tackified elastomers are also useful as the adhesive face of tapes, for example. Unfortunately synthetic rubber-like polymers such as polybutadiene, butadiene/styrene copolymers butyl rubber, polyisobutylene, and particularly polymers of the EOM type, that is, copolymers of ethylene and another alpha-olefin, and EODM type, that is, polymers of ethylene, another alpha-olefin and a diene, preferably a non-conjugated diene having only one readily polymerizable double bond, do not exhibit good building tack. The various means heretofore devised to overcome this deficiency, including the addition of relatively large amounts of natural rubber, synthetic resins or natural products such as rosins or gums during the compounding operation have not proven entirely satisfactory. There has been a need for a means of rapidly generating improved and long-lasting tack in such elastomers as well as for a means of improving the tack of such elastomers without any need to resort to stratified structures or the additional step inherent in making such structures, of coating adhesive on the layers to be adhered, without any need to resort to the addition to the elastomer of large amounts of "sticky" adhesives which create processing difficulties and detract from the other physical properties of the elastomer, and without resort to processes which require the aging of elastomer-resin compositions in order to promote tack.

Notably deficient in building tack are ethylene/propylene/non-conjugated diene elastomers, hereinafter referred to as EPDM elastomers and ethylene/propylene elastomers, hereinafter referred to as EPM elastomers, and there is a particular need for a satisfactory method of rapidly promoting good, long-lived building tack in such elastomers.

SUMMARY OF THE INVENTION

In accordance with this invention synthetic hydrocarbon elastomers are provided with excellent building tack by uniformly mixing the elastomer with at least one member from the group: N,N'-disubstituted-p-arylene diamines, 1,2-dihydro-2,2,4-trialkyl quinolines, 1,4-di-2,4-cyclopentadien-1-yl-2-butene and a diester of 5-norbornene-2-methanol and a dicarboxylic acid, said compounds hereinafter referred to as antiozonants for the sake of convenience, and subsequently exposing the uncured elastomer/antiozonant composition to sufficient ozone or to ultraviolet light in the presence of oxygen to produce a peel tack which is at least one pound per linear inch more than the peel tack before exposure, both measured at room temperature. Ozone exposure is preferred and a concentration of about 5–500 parts ozone per million parts air has been found sufficient to produce desirable tack within a period of from about 1–120 seconds.

Optionally, the elastomer/antiozonant mixture may contain organic cyclic resins, having at least one polar functional group and a molecular weight of at least about 200; such compositions, when treated by the process of the present invention, exhibit improved building tack which is rapidly generated and which exhibits improved longevity.

DETAILS OF THE INVENTION

Antiozonants which are useful in this invention include elastomer soluble N,N'-disubstituted-p-arylene diamines such as those disclosed in U.S. Pat. 3,247,161 to Cox (Universal Oil Products Co.); "Antiozonants," Geschwind, Gruber and Kalil, Rubber Age, October 1967; and "Ozone Chemistry and Technology," Advances in Chemistry, Series No. 21, pages 176–183. The term "elastomer soluble" as used herein means that said diamines are at least partially soluble in the elastomer. Preferably the diamine is at least about 0.5–1.0% by weight soluble in the elastomer. Also useful are 1,2-dihydro-2,2,4-trialkyl quinolines such as 1,2-dihydro-2,2,4-trimethyl quinoline, polymerized 1,2-dihydro-2,2,4-trimethyl quinoline (AgeRite Resin-D, manufactured by the Vanderbilt Chemical Corp., is a commercially available polymerized quinoline of this type which is useful), and alkyl, alkoxy, carboxy or halogen substituted 1,2-dihydro-2,2,4-trialkyl quinolines, particularly useful are alkoxy substituted 1,2-dihydro-2,2,4-trialkyl quinolines wherein the alkoxy preferably contains about 1–5 carbon atoms and the alkyl preferably contains about 1–3 carbon atoms, 1,4-di-2,4-cyclopentadien-1-yl-2-butene, diesters of 5-norbornene-2-methanol and a dicarboxylic acid, said acid preferably containing about 2–8 carbon atoms.

Antiozonants which have been found especially useful in the process of this invention for promoting building tack are an N,N'-diaryl-p-phenylenediamine prepared by condensing one mole of hydroquinone with 2 moles of a mixture containing 20–80% by weight of o-toluidine and 20–80% mixed xylidines, an N,N'-diaryl-p-phenylenediamines nown as "Wingstay 100" which is available from the Goodyear Tire and Rubber Company, N,N'-bis(1-ethyl-3-methylpentyl)-p-phenylenediamine, 6 - ethoxy-1,2-dihydro-2,2,4-trimethylquinoline, N - isopropyl-N'-phenyl-p-phenylenediamine, a diester of 5-norbornene-2-methanol and adipic acid, and a diester of 5-norbornene-2-methanol and maleic acid.

This invention is useful for promoting building tack in synthetic hydrocarbon elastomers, especially in EOM polymers, preferably those in which the alpha-olefin contains about 3–8 carbon atoms and EODM polymers, preferably those in which the alpha-olefin contains about 3–8 carbon atoms and the diene is a non-conjugated diene containing about 6–22 carbon atoms and is particularly useful for promoting building tack in ethylene/propylene (EPM) and ethylene/propylene/non-conjugated diene copolymers (EPDM), the diene containing about 6–22 carbon atoms and having only one readily polymerizable double bond. The phrase "diene having only one readily polymerizable double bond" referes to dienes, such as those specifically disclosed herein, in which only one double bond takes part in the polymerization reaction to any significant extent. EPDM polymers which are especially preferred are copolymers of ethylene/propylene/1, 4-hexadiene, and ethylene/propylene/ethylidene norbornene. Other representative copolymers in which tack is promoted by the process of this invention are those described in U.S. 2,933,480 to Gresham and Hunt, U.S. 3,063,973 to Gladding and Nyce, and U.S. 3,093,621 to Gladding. It is preferred that the polymers employed be amorphous, that is, that they exhibit no crystallinity to the X-ray. This invention is also useful with such elastomers in combination with other elastomers or natural rubber. With compositions which are blends of natural rubber and EODM polymer best results are obtained in accordance with this invention when the concentration of natural rubber is low, i.e., less than about 10% by weight natural rubber.

Other synthetic rubbers which can be effectively tackified by this invention include butadiene/styrene copolymers, butadiene and isobutylene polymers and combinations of these with natural rubber and/or EODM polymers. It is preferred that, when natural rubber blends of this type are employed, that the blend contain less than about 40% by weight natural rubber.

The compositions of the present invention are made by mixing the elastomer and antiozonant in any convenient manner which will produce a uniform mixture. About 0.1–10, preferably 0.1–2, parts by weight antiozonant per 100 parts elastomer are employed. This can be accomplished by milling on a conventional rubber mill or in a Banbury mixer. Conveniently the antiozonant is added to the polymer during the regular compounding operations wherein one or more other additives, curing agents, pigments, process oil, reinforcing fillers, etc. are added. The presence of such additives is not necessary to gain the advantages of this invention although they are normally added to obtain practical elastomeric formulations and it is preferred that the compositions of this invention include process oil and reinforcing fillers such as carbon black. The addition of process oil is frequently desirable, particularly with very high molecular weight elastomers, in order to obtain optimum flow properties in the elastomer stock. The addition of reinforcing filler is particularly important where the low green strength of the raw elastomer limits the maximum amount of tack strength. Typical reinforcing fillers which can be employed include, for example, Super Abrasion Furnace carbon black, Intermediate Abrasion Furnace carbon black, High Abrasion Furnace carbon black, Fast Extruding Furnace carbon block, Semi-Reinforcing Furnace carbon black, Easy Porcessing Channel carbon black, and Medium Thermal carbon black.

Useful elastomer compositions typically contain at least about 5 parts by weight, preferably 5–100 parts by weight, of filler per 100 parts of elastomer. Process oil is generally incorporated into such elastomer composition to the extent of at least about 5 parts by weight per 100 parts elastomer and preferably to the extent of about 10–50 parts by weight per 100 parts elastomer.

Following mixing, the elastomer-antiozonant composition is activated by exposure to ultraviolet light in the presence of oxygen or exposure to ozone, under controlled conditions, to generate the desired tack in the composition. Aging of the elastomer-antiozonant composition prior to exposure to ozone or ultravilet light (UV) is not required by the process of the present invention. The ozone concentration or UV exposure to which the elastomer-antiozonant composition is exposed and duration of exposure are coordinated since too much or too little exposure to ozone or UV can prevent the generation of the desired building tack in the composition. Desirable tack is generally achieved when the surface of the elastomer/antiozonant composition is exposed to ozone at a concentration of about 5.0–10,000 p.p.m. ozone (parts ozone per million parts air) for periods of about 1–20 seconds. Preferred ozone exposure is at about 5–500 p.p.m. ozone for periods of about 5–120 seconds. The optimum ozone exposure to generate a desired degree of tack in a particular stock can easily be determined by trial tests.

In place of ozone or UV light as the activating agent for generating tack of the elastomer mixtures ozone producing agents can be used, such as spark discharge.

An alternative embodiment of this invention involves mixing the antiozonants employed herein with the elastomer and an organic cyclic resin, having at least one polar functional group and a molecular weight of at least about 200, and subsequently exposing this elastomer/antiozonant/resin composition to ozone in the manner hereinbefore described. Treatment of EOM or EODM elastomer/antiozonant/organic cyclic resin compositions by the process of this invention results in the rapid generation of tack, said tack exhibiting improved longevity.

The organic cyclic resins useful in the alternative embodiment of this invention are, in general, isoprenoid resins, terpenoid resins or heat insensitive phenolformaldehyde resins or other compounds or resins with a molecular weight of at least about 200 and having similar functional groups and properties. The cyclic resins useful in this invention contain at least one polar functional group. The latter can be attached directly to a ring carbon or an alicyclic carbon atom or be part of a ring. Representative polar functional groups include an ethylenically unsaturated group (C=C), hydroxyl (—OH), ester (—COOR), carboxy (—COOH), amide (—CONH$_2$), amine (—NH$_2$), cyanide (—CN), thiol (—SH), aldehyde (—CHO), OXO (=O), carbonyl

and the like. The cyclic resins include condensation products such as phenol-aldehyde resins and compounds with polycyclic rings as in abietic acid and derivatives thereof. R is aliphatic or aromatic.

The terpenoid resins useful in this invention include terpenes, rosins, modified rosins and derivatives of these which meet the criteria set forth above. The class includes hydrogenated and partially hydrogenated rosins, aromatized and polymerized rosins and derivatives thereof, containing one or more or a combination of the polar functional groups mentioned above. In such compounds the normal functional groups can be replaced with one of the functional polar groups mentioned above (e.g., abietic acid in which the carboxy group is substituted by a hydroxyl group). Resin acids which are useful tackifiers include abietic acid, neoabietic acid, dehydroabietic acid, dihydroabietic acid, tetrahydroabietic acid, levo pimaric acid, dextro pimaric acid and isodextro pimaric acid. Dimers and derivatives of these acids containing one or more of the above functional groups, particularly the esters, can also be used.

The following specific compounds are also useful in the alternative embodiment of this invention:

Levo pimaric acid modified with maleic anhydride
Levo pimaric acid modified with fumaric acid.

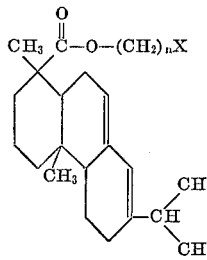

where $x=$ —OH, —COOH, —COONH$_2$, —COONR$_2$

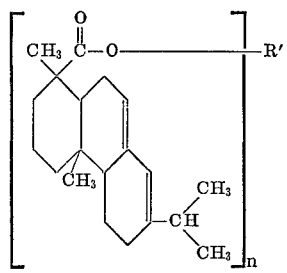

where $n=$ the valence of R′, and R′ is CH$_3$—, C$_2$H$_5$—; CH$_2$=CH—CH$_2$—, phenyl, cyclohexyl, —CH$_2$—CH$_2$—,

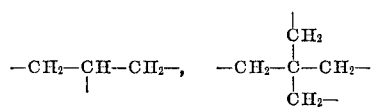

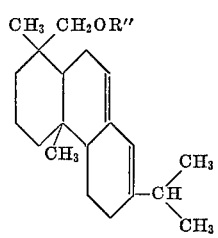

where R″=H, CH$_3$, C$_2$H$_5$, CH$_2$=CH—CH$_2$—, phenyl, cyclohexyl

Hydroabietyl alcohol and its esters.

Resin acids modified by reaction with phenolic resins in accordance with the following type reaction:

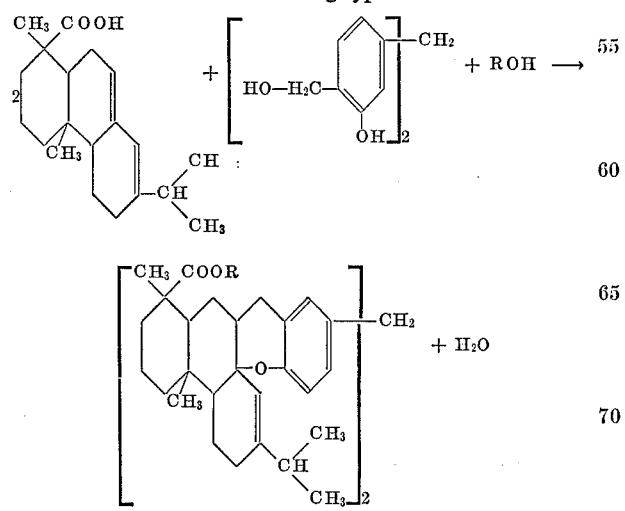

where R is an aliphatic or aromatic group.

Terpene phenolic resins, oil soluble (e.g., resin sold as Durez 12603)

Hydroxylated petroleum hydrocarbon resin (e.g., hydroxylated Piccopale resin)

Zinc, aluminum and other heavy metal salts of the resins mentioned above, and which are known as resinates, are also useful in this invention.

The isoprenoid compounds useful in this invention include resinous polymers such as the Diels-Alder reaction product of isoprene with piperylene, butadiene, dicyclopentadiene or combinations thereof, the polymerization being conducted with an acid catalyst. Such polymers modified by introduction of one or more of the above-mentioned polar functional groups are preferred and carboxylated, hydroxylated and phenolated derivatives of such polymers are especially preferred. Commercial polymers which can be so modified include Wingtack 95 and Betaprene H, sold by Goodyear Tire and Rubber Company and Reichhold Chemical Company, respectively. Although heat-insensitive phenol-aldehyde resins generally are useful, phenol-formaldehyde resins meeting the above criteria are particularly preferred. The phenol-aldehyde resins useful in this invention are heat-insensitive in the sense that they are stable to change under the conditions of incorporation into the elastomer and its ultimate use.

An especially useful isoprenoid resin is an inter-addition polymer of an isoprenoidal codimer, as exemplified by an interdimer of isoprene and allylically terminated cyclopentadiene, wherein the isoprenoidal codimer is about 50–90% of the final copolymer by reason of reaction (termination with 2-methyl-butene or alpha-methyl-styrene in an amount at least equal to the amount of cyclodienes present.

The cyclic resins useful in the alternative embodiment of this invention are incorporated into the synthetic hycarbon elastomers in amounts of about 1–50 phr. (parts resin per hundred parts polymer by weight) and preferably in an amount of 2–10 phr. It is desirable to use as little cyclic resin as will provide the desired tack for economic reasons and to avoid adverse effects on curability of the polymer.

The following examples illustrate the invention. All parts, percentages and proportions are by weight unless otherwise indicated.

Polymers B and C used in the examples are EPDM polymers made by copolymerizing ethylene (E) with propylene (P) and 1,4-hexadiene (HD) in tetrahydroethylene in the presence of a pre-formed coordination catalyst prepared by mixing VOCl$_3$ and diisobutylaluminum monochloride in accordance with the general procedures of U.S. Pat. 2,933,480. These polymers are further characterized as follows:

MONOMER UNIT COMPOSITION

| Polymer | Weight percent | | | Ethylenic C=C [1] | Mooney viscosity [2] |
|---|---|---|---|---|---|
| | E | P | 1,4-HD | | |
| B | 52 | 44 | 4 | 0.33 | 70 |
| C | 53.5 | 40 | 6.5 | 0.61 | 70 |

[1] Mols per kg. of polymer.
[2] ML 1+4/121° C.

Polymer Z, used in the examples, is an EPDM polymer made by copolymerizing ethylene (E) with propylene (P) and 1,4-hexadiene (HD) in tetrachloroethylene in the presence of a coordination catalyst made in situ by combining VCl$_4$ and diisobutyl aluminum chloride in accordance with the general procedures of U.S. Pat.

2,933,480. This polymer is further characterized as follows:

MONOMER UNIT COMPOSITION

| Polymer | Weight percent | | | Ethylenic C=C[1] | Mooney viscosity[2] |
|---|---|---|---|---|---|
| | E | P | 1,4-HD | | |
| Z | 60.5 | 36 | 3.5 | 0.28 | 60 |

[1] Mols per kg. of polymer.
[2] ML 1+4/121° C.

Polymer H, used in the examples, is an EPDM polymer made by copolymerizing ethylene with propylene and 1,4-hexadiene in tetrachloroethylene in the presence of a coordination catalyst made in situ by mixing vanadium tris(acetylacetonate) and diisobutyl aluminum monochloride in accordance with the general procedure of U.S. Pat. 2,933,480. This polymer is further characterized as follows:

MONOMER UNIT COMPOSITION

| Polymer | Weight percent | | | Ethylenic C=C[1] | Mooney viscosity[2] |
|---|---|---|---|---|---|
| | E | P | 1,4-HD | | |
| H | 60.5 | 36 | 3.5 | 0.28 | 60 |

[1] Mols per kg. of polymer.
[2] ML 1+4/121° C.

Polymer I, used in the examples, is an EPDM polymer made by copolymerizing ethylene with propylene and 5-ethylidene-2-norbornene in hexane in the presence of a vanadium-based catalyst in accordance with the general procedures of U.S. Pat. 3,341,503. Polymer I has a Mooney viscosity (ML 1+4/100° C.) of 90 and contains the following monomer unit composition (by weight): 52.7% ethylene; 43% propylene; 4.3% diene. It also contains about 1% tris(nonylphenyl)phosphite stabilizer and a fatty acid monoester of polypropyleneether glycol.

Polymer J, used in the examples, is an EPM polymer made by copolymerizing ethylene with propylene in the presence of the above described vanadium based catalyst. It has a Mooney viscosity (ML 1+8/100° C.) of 40 and contains 43 weight percent ethylene monomer units and 57 weight percent propylene monomer units.

Antiozonant 1, used in the examples, is an N,N'-diaryl-p-phenylenediamine prepared by condensing one mole of hydroquinone with 2 moles of a mixture containing 80% by weight of o-toluidine and 20% mixed xylidines. The powdered product is mixed with 2 parts of calcium silicate and 3 parts of a naphthenic petroleum oil. The N,N'-diaryl-p-phenylenediamine is made by heating:

| | G. |
|---|---|
| o-Toluidine | 290 |
| Hydroquinone | 165 |
| AlCl$_3$ | 7 |
| Mixed xylidines | 73 | where the mixed xylidines are typically:

| | Percent by wt. |
|---|---|
| Toluidines | 0.35 |
| 2-ethylaniline | 7.4 |
| 4-ethylaniline | 5.5 |
| 2,4-xylidine | 50.9 |
| 2,6-xylidine | 14.0 |
| 3,5-xylidine | 1.3 |
| 2,5-xylidine | 11.6 |
| 2,3-xylidine | 5.4 |
| 3,4-xylidine | 3.4 |

The above described reaction mixture is heated to reflux (208° C.) and heating is continued for 16 hours (final temperature 250° C.). When no more water appears in the condensate, vacuum at 250° C. is applied to remove low-boiling materials from the product. The final product weighs 395 g. (90% yield based on hydroquinone) and melts at 83–108° C.

Resin R, used in the examples, is an oil soluble, thermoplastic resin which is made by reacting slightly more than a mole of a branched p-1,1,3,3-tetramethylbutyl substituted phenol with a mole of formaldehyde in the presence of acid. Resin R melts in the range 65–75° C. and has a hydroxyl equivalent of 197. Analysis (by weight): 81.6% C; 10.3% H; 8.28% O.

Resin R', used in the examples, is the ethylene glycol ester of polymerized rosin.

PREPARATION OF COATED FABRIC FOR TIRE CARCASS

Preparation of dipping composition (A) Preparation of chlorosulfonated polyethylene latex.—A chlorosulfonated polyethylene is selected containing about 20% chlorine and 1% sulfur. A 12.5% solids solution is prepared by dissolving this chlorosulfonated polyethylene and 0.1 phr. (parts per 100 parts of polymer) dinitrotoluene in an 88/12 benzene/isopropanol mixture. Two parts of this solution are then added to one part of water containing 8 phr. of sodium alkyl benzene sulfonate ("Nacconol NRSF") and 0.25 phr. of sodium nitrate in a high shear mixer at 80° C. Solvent is removed from the resulting emulsion with steam at atmospheric pressure to give a latex. After 0.8 part of ammonium alginate has been added for each 100 parts of latex solids, the composition is allowed to cream by standing for several days at room temperature. Typically, a 47.7% solids latex results.

(B) Preparation of emulsifier.—10 parts of "Kenflex A-36" and 1 part of oleic acid are mixed, warmed to 100° C. and added to 0.6 part of triethanolamine and 13.4 parts of water. The emulsifier is made by agitating this mixture in a homogenizer. Kenflex A-36 resin is a polymerized aromatic petroleum resin (made by Kenrich Petrochemicals, Inc.) having a melting point of 80° C. and a specific gravity of 1.086.

(C) Preparation of dipping composition.—13 parts of resorcinol and 14.4 parts of 37% formaldehyde are dissolved in 75 parts of water; then 200 parts of the latex prepared in paragraph A above and 25 parts of the emulsifier are added with the stirring. The resulting composition is diluted with 315 parts of distilled water. The pH is about 7.5. The solids content is about 18.8% and may generally be in the range of about 20±3%. In general this dip is aged at room temperature about 2–3 days. The pH should be about 6.7.

Carcass fabric 210 filament, 2-plied, 1260 denier nylon 66 tire cord is used.

Application of adhesives to carcass fabric

This fabric, moving at the rate of 25 yards/minute, is dipped once by standard techniques in a composition having the formulation listed below to obtain a 43 mil (gauge) ply fabric.

| Dip formulation: | Pounds |
|---|---|
| Water | 75 |
| Resorcinol | 13 |
| Formaldehyde (37%) | 14.4 |
| Chlorosulfonated polyethylene latex | 200 |
| Emulsifier | 25 |
| Water | 315 |

It is then stretched 10% while being dried at 445° F. for 0.8 minute.

FORMULA I

Standard ingredients for 100 parts of polymer in carcass skim stock

| | |
|---|---|
| APF carbon black (a high structure furnace black having an EM (electron microscope) surface area of about 49 square meters per gram and a DBF (dibutyl phthalate absorption number by ASTM Test D 2414-65T) absorption of about 127 cc./100 grams) | 75 |
| Sunpar 2280 Oil (a paraffinic petroleum oil, ASTM type 104B, SUS (Saybolt Universal viscosity by ASTM Test D 88) viscosity 100° F./210° F.= 2907/165; 23.5% total aromatics) | 40 |
| Zinc oxide | 5 |
| 2-mercaptobenzothiazole | 0.75 |
| Tetramethylthiuram disulfide | 0.5 |
| Zinc dibutyldithiocarbamate | 1.5 |
| Sulfur | 2.0 |
| Stearic acid | 1.0 |

Processing (A) Mixing carcass skim stocks.—Carbon black, petroleum oil, and antiozonant (and resin—when used) can be added to polymer on a conventional rubber roll mill or in an internal mixer such as a Banbury Model OOC or Model 11 Mixer.

In a typical mill mixing procedure, polymer is banded on a mill cooled with 40° C. water; stearic acid, carbon black and petroleum oil are added, and the resulting masterbatch is mixed for ten minutes to get a good dispersion. When solid resin is to be added along with the antiozonant, the mill is first heated to 150° C.; the resin melts and is adequately dispersed after 3–5 minutes additional mixing. The antiozonants are milled in at temperatures above their melting points to obtain optimum dispersion. In any case, zinc oxide, and the curing ingredients are added to the masterbatch on a 40° C. mill, followed by 6 cigar-rollings to finish the mixing process and produce the desired carcass skim stock.

In a typical internal mixing procedure, polymer and stearic acid are charged into a water-cooled No. 11 Banbury operated at a speed of 40 r.p.m. and a ram pressure of 100 p.s.i. Carbon black and petroleum oil are added in increments, the temperature being kept at about 235° F. After about 4–5 minutes mixing time, antiozonant is introduced. If resin is also used, it is added at this time; the Banbury temperature is then about 250° F. Mixing continues for about 1–2 more minutes. The masterbatch is dumped (Banbury temperature 280–300° F.) and compounded with zinc oxide and the curing ingredients on a 40° C. rubber roll mill to make the desired carcass skim stock. A similar skim stock is made if the resin is added ahead of the black and oil or if half the black is added to the polymer, followed by the oil, the other half of the black, and the resin.

Preparation of rubberized carcass fabric

For test purposes, only one side of the treated nylon fabric described hereinbefore need be coated with carcass skim stock. Typically that step is done on an Adamson United calender having 3 rolls each 20 inches long and 8 inches in diameter; the top and bottom rolls are at 180° F.; the center roll is at 170° F.; the friction value is 1.22.

Banbury-mixed carcass skim stock travels from a 160° F. warm-up mill to the upper calender nip and thence to the lower calender nip where it is pressed against the nylon fabric described above. A 0.010–0.015-inch layer of skim stock is deposited. The resulting rubberized carcass fabric is wrapped in polyethylene at the end of the calender train.

Carcass fabric, coated on each side with the carcass skim stock, is made in a similar way by one pass through a conventional 4-roll calender.

The following tests are used to determine the amount of tack in the elastomer illustrated in the example.

Peel tack

Test samples are formed by cutting a ¼" x 6" sample from carcass fabric or by pressing a 6" x 3" x 0.75" sheet of elastomeric material between a cotton duck backing and a polyethylene terephthalate film, to embed the cotton duck in one face, using a laboratory compression molding press, with mild pressure at a temperature of 100° C. for 3 minutes. Test strips ¼" wide are cut from the backed sheet, the film is removed, and pairs are joined by placing the elastomeric surfaces together and rolling with an 8-pound weight. Thirty seconds after joining the strips they are pulled apart in a tensile testing machine at a draw rate of 2.5 inches per minute at 20–25° C. The peel strength is recorded in pound per linear inch.

Hold tack

This method measures the tack bond in tensile loading (quick grab tack). Specimens are cut from either (a) the carcass fabric in 1" x ½" strips with the cords parallel to the long axis or (b) from fabric constructed as described under the Peel Test. One piece is mounted vertically on the face of a fixed metal block. The other piece is mounted horizontally across a similar block which can be driven into contact with the first block by an air activated cylinder. When the faces of the pieces are contacted, the contact force is measured by the pressure applied to the air cylinder. A contact force of 20 pounds is used. The time of contact is determined by a timing mechanism which can be set for an interval of 0.8 to 15 seconds. A contact time of one second is used followed by application of a 5-pound breaking force. The time at which the surfaces separate is recorded up to a maximum of 600 seconds as a measure of the degree of hold tack.

Activation of the carcass fabric

Ozone exposure of carcass fabric is done continuously using a continuous ozonator.

After exposure to ozone, the treated samples are normally stored in the dark at ambient room conditions and tested for retention of peel and hold tack, as described above, at periodic time intervals.

EXAMPLE 1

Carcass fabrics are made in accordance with the above-described general procedures using skim stocks having the following compositions:

| | Composition [1] (parts by weight) | | | |
|---|---|---|---|---|
| | Polymer | Antiozonant [1] | Resin R | Resin R' |
| Skim stock: | | | | |
| 1 | 100 | 2 | 0 | 0 |
| 2 | 100 | 2 | 10 | 0 |
| 3 | 100 | 2 | 0 | 10 |
| Control: | | | | |
| 1 [2] | 100 | 0 | 0 | 0 |
| 2 [2] | 100 | 0 | 10 | 0 |
| 3 [2] | 100 | 0 | 0 | 10 |

[1] Standard ingredients are also present in the stock.
[2] Outside the scope of this invention; presented merely for purpose of comparison.

In each case, the polymer surface is thereafter exposed to 125 p.p.m. $O_3$ for a given period of time and tested for peel tack and hold tack by the general procedures described above. Conveniently ozone exposure is conducted at room temperature, although temperature is not critical. Typical test data for polymer B for peel and hold tack are presented in Tables I and II, respectively, below.

In the absence of ozone treatment all the carcass fabrics have poor peel tack, i.e., less than about 3 pounds per linear inch, and practically no hold tack, i.e., less than about 1 sec. Ozone treatment of Control 1 containing no additive fails to improve the tack in any way. In sharp contrast, even a brief (5-second) exposure of a carcass fabric prepared from skim stock No. 1 containing Antiozonant 1 creates excellent peel and hold tack which lasts for at least three days. Longer exposures tend to enhance peel tack retention. They may have a pronounced effect on the hold tack. Initially, no hold tack improvement may be observed. After the treated carcass fabric has aged a day at room temperature, excellent hold tack may appear and remain for at least a month (see data for 10-sec. $O_3$ exposure). Unduly long exposure to $O_3$ may destroy hold tack development altogether.

Greatly enhanced processing freedom is gained by using Resin R or R' in combination with Antiozonant 1. In the case of carcass fabric prepared from Skim Stocks 2 and 3 and exposed to ozone for 10 to 60 seconds, hold tack is initially outstanding and remains that way throughout the thirty-day aging period. The peel tack of Polymer (B) containing the Antiozonant 1-resin combination may depend somewhat on the nature of the resin. When the more effective Resin R' is present, peel tack is initially good, becomes outstanding after a day and remains that way.

Ozone treated controls 2 and 3 containing Polymer (B) and Resins R and R', respectively, can exhibit good peel and hold tack, but longer exposure to ozone is required than in the case of the compositions of the present invention; furthermore, tack retention is not as effective. For example, long (20-sec.) ozone treatment of Control 2 containing Resin R gives good initial peel tack and excellent initial hold tack; after three days the peel tack has dropped to a low value; after seven days the hold tack has decreased, becoming negligible by thirty days.

EXAMPLE 2

Carcass fabrics are made in accordance with the above-described general procedures using skim stocks containing one of the following EPDM polymers:

Polymer C
Polymer Z
Polymer H
Polymer I
Polymer J

The Standard Ingredients as described in Formula I are added to each stock used in this example. Then Antiozonant 1 (1 phr.) is incorporated into those stocks corresponding to the present invention; additionally, some of these stocks contain 10 phr. Resin R'. For purpose of comparison, stocks are made without Antiozonant 1; some of these controls have 10 phr. Resin R'.

In each case, the polymer surface of the carcass is exposed to 125 p.p.m. ozone ($O_3$) for a given period of time and tested for peel and hold tack by the general procedures described above. Conveniently ozone exposure is conducted at room temperature. Typical test data are given in Tables I–II below.

General discussion of data in Tables I–II

In Tables I–II "A" stands for Antiozonant 1; "R" stands for Resin R; "R'" stands for Resin R'. "C'" stands for the polymer+Standard Ingredients.

Controls "C'" have poor to nil peel tack and hold tack.

Controls "C'+R" or "C'+R'" have excellent peel tack and hold tack initially but it generally decreases to unacceptably low values after the control has aged a few days.

"C'+A" compositions generally have excellent initial peel tack which is retained on aging. The initial hold tack is sensitive to the length of ozone treatment (e.g., 5-sec. exposure, >600 hold tack, 10 sec. exposure <1 hold tack; Polymer B); long treatments seem to destroy hold tack unless resin is also present.

Generally there is unexpected synergism between antiozonant and resin. For Polymer Z, the peel tack and hold tack are both nil and after 7 days aging for carcass containing antiozonant or resin and exposed to ozone for 30 seconds; yet a carcass containing both additives and similarly exposed and aged has outstanding tack.

In the absence of ozone treatment all the samples have poor peel tack, i.e., less than about 3 pounds per linear inch and practically no hold tack, i.e., less than about 1 second.

TABLE I.—PEEL TACK
[In Pounds per Linear Inch]

| Example | Polymer | Length of ozone exposure (seconds) | Sample [1] | Initial | 1 day | 3 days | 7 days | 30 days |
|---|---|---|---|---|---|---|---|---|
| 1 | B | 10 | C' | <1 | <1 | | | |
| 1 | B | 10 | C'+A | 17 | 13 | 18 | 13 | 14 |
| 1 | B | 10 | C'+A+R | 12 | 4 | 7 | 5 | 4 |
| 1 | B | 20 | C'+R | 10 | | 2 | 3 | 6 |
| 1 | B | 10 | C'+A+R' | 11 | 16 | >18 | >18 | 9 |
| 1 | B | 10 | C'+R' | 9 | 1 | 1 | 12 | 3 |
| 1 | B | 30 | C' | <1 | <1 | | | |
| 1 | B | 30 | C'+A | 16 | 15 | 17 | 12 | 13 |
| 1 | B | 30 | C'+A+R | 11 | 10 | 14 | 12 | 9 |
| 1 | B | 20 | C'+R | 10 | | 2 | 3 | 6 |
| 1 | B | 30 | C'+A+R' | 11 | 15 | >18 | 17 | 17 |
| 1 | B | 30 | C'+R' | 12 | 9 | >18 | 15 | 7 |
| 2 | C | 30 | C' | 1 | <1 | | <1 | |
| 2 | C | 30 | C'+A | 18 | >18 | | 16 | 3 |
| 2 | C | 30 | C'+A+R | 18 | >18 | | >18 | 18 |
| 2 | C | 30 | C'+R | 18 | >18 | | 2 | |
| 2 | H | 30 | C' | 1 | <1 | | <1 | |
| 2 | H | 30 | C'+A | 15 | 15 | | 16 | [2] 6 |
| 2 | H | 30 | C'+A+R | 15 | 15 | | 15 | 18 |
| 2 | H | 30 | C'+R | 16 | 2 | | 2 | |
| 2 | I | 30 | C'+A+R | 1 | 0 | | 0 | |
| 2 | I | 30 | C'+A+R | 6 | 7 | | 8 | |
| 2 | I | 30 | C'+R | 7 | 2 | | 2 | |
| 2 | Z | 30 | C' | 1 | <1 | | <1 | |
| 2 | Z | 30 | C'+A | 12 | 12 | | 2 | |
| 2 | Z | 30 | C'+A+R | 18 | 17 | | >18 | |
| 2 | Z | 30 | C'+R | 18 | 3 | | >1 | |

| | | | | | 7 days | 30 days | 60 days |
|---|---|---|---|---|---|---|---|
| 2 | J | 60 | C' | 2 | 2 | 2 | 2 |
| 2 | J | 60 | C'+A | 15 | 14 | 13 | 14 | 15 |
| 2 | J | 60 | C'+A+R | 13 | 17 | 13 | 17 | >18 |
| 2 | J | 60 | C'+R | 11 | 14 | 9 | 8 | 8 |
| 2 | J | 10 | C' | 2 | 2 | 2 | 2 | 2 |
| 2 | J | 10 | C'+A | 9 | 11 | 14 | 6 | 5 |
| 2 | J | 10 | C'+A+R | 12 | 17 | 15 | 17 | >18 |
| 2 | J | 10 | C'+R | 5 | 5 | 5 | 2 | 2 |

[1] C'=Control 1; C'+A=Skim stock 1; C'+A+R=Skim stock 2; C'+R=Control 2; C'+A+R'=Skim stock 3; C'+R'=Control 3. (Using the polymer indicated in the left hand column and the antiozonant concentration indicated in the examples.)
[2] 60 second exposure.

TABLE II.—HOLD TACK
[In Seconds]

| Ex. | Polymer | Length of ozone exposure (seconds) | Sample | Initial | 1 day | 3 days | 7 days | 30 days | 60 days |
|---|---|---|---|---|---|---|---|---|---|
| 1 | B | 10 | C' | <1 | <1 | | | | |
| 1 | B | 10 | C'+A | 1 <1 | >600 | >600 | >600 | >600 | |
| 1 | B | 10 | C'+A+R | >600 | 232 | 216 | 298 | >600 | |
| 1 | B | 20 | C'+R | >600 | | >600 | 85 | <1 | |
| 1 | B | 10 | C'+A+R' | >600 | >600 | >600 | >600 | >600 | |
| 1 | B | 10 | C'+R' | 43 | 24 | 5 | <1 | 3 | |
| 1 | B | 30 | C' | <1 | <1 | | | | |
| 1 | B | 30 | C'+A | <1 | 243 | >600 | >600 | <1 | |
| 1 | B | 30 | C'+A+R | >600 | >600 | >600 | >600 | >600 | |
| 1 | B | 20 | C'+R | >600 | >600 | >600 | <85 | >600 | |
| 1 | B | 30 | C'+A+R' | >600 | >600 | >600 | >600 | 100 | |
| 1 | B | 30 | C'+R' | >600 | 152 | >600 | >600 | >600 | |
| 2 | C | 30 | C' | <1 | <1 | | <1 | <1 | |
| 2 | C | 30 | C'+A+R | 600 | >600 | | >600 | >600 | |
| 2 | C | 30 | C'+R | 600 | >600 | | <1 | 12 | |
| 2 | I | 30 | C' | <1 | <1 | | <1 | <1 | |
| 2 | I | 30 | C'+A+R | 600 | >600 | | >600 | <1 | |
| 2 | I | 30 | C'+R | 600 | <1 | | <1 | <1 | |
| 2 | J | 10 | C' | 6 | 4 | | 2 | <1 | <1 |
| 2 | J | 10 | C'+A | 600 | 600 | | >600 | >600 | >600 |
| 2 | J | 10 | C'+A+R | >600 | 600 | | 600 | >600 | >600 |
| 2 | J | 10 | C'+R | 395 | 600 | | 69 | >600 | >600 |
| 2 | J | 60 | C' | 28 | 16 | | 3 | <1 | <1 |
| 2 | J | 60 | C'+A | 600 | 600 | | >600 | >600 | <1 |
| 2 | J | 60 | C'+A+R | >600 | >600 | | >600 | >600 | >600 |
| 2 | J | 60 | C'+R | 600 | 600 | | >600 | >600 | >600 |
| 2 | Z | 30 | C' | 5 | <1 | | <1 | <1 | |
| 2 | Z | 30 | C'+A+R | 600 | >600 | | >600 | >600 | |
| 2 | Z | 30 | C'+R | 600 | 78 | | <1 | <1 | |

1 600 for 5-second exposure.

EXAMPLE 3

This example illustrates the use of various antiozonants. Each test specimen is made by adding 0.88 part of the antiozonant to 100 parts of Banbury compounded carcass skim stock having the following composition.

| Component: | Parts by wt. |
|---|---|
| Polymer B | 100 |
| FEF carbon black | 75 |
| Sunpar 2280 oil | 40 |
| Stearic acid | 1.0 |
| Zinc oxide | 5.0 |
| 2-mercaptobenzothiazole | 0.75 |
| Tetramethyl thiuram disulfide | 0.5 |
| Zinc dibutyldithiocarbamate | 1.5 |
| Sulfur | 2.0 |

Test specimens are prepared from the skim stock described above and thereafter the surface of each resulting composition is exposed to 125 p.p.m. ozone and tested for peel tack by the general procedures described above. Typical test data are given in Table III below. For purposes of comparison, data outside the scope of this invention included for compositions which have not been exposed to ozone. In Table III:

Antiozonant 2 ("Wingstay 100," available from Goodyear Tire and Rubber Co.) is an N,N'-diaryl-p-phenylenediamine.

Antiozonant 3 ("UOP 88," available from Universal Oil Products) is N,N'-bis(1-ethyl-3-methylpentyl)-p-phenylenediamine.

Antiozonant 4 ("Santoflex AW," available from Monsanto) is 6-ethoxy-1,2-dihydro-2,2,4-trimethylquinoline.

Antiozonant 5 ("Nonox ZA," available from ICI) is N-isopropyl-N'-phenyl-p-phenylenediamine.

TABLE III

| | Peel tack (p.l.i.) | | |
|---|---|---|---|
| | 0-sec. $O_3$ [1] | 60-sec. $O_3$ | 120-sec. $O_3$ |
| Antiozonant 2: | | | |
| Initial | 0.9 | 17 | 17 |
| 1 day | 1.5 | 17 | 17 |
| 4 days | 1.0 | 17 | 17 |
| 7 days | 0.9 | 17 | 16 |
| 14 days | 0.9 | 17 | 17 |
| Antiozonant 3: | | | |
| Initial | 1.9 | 17 | 17 |
| 1 day | 1.2 | 17 | 17 |
| 4 days | 1.4 | 17 | 17 |
| 7 days | 1.2 | 17 | 17 |
| 14 days | 1.0 | 17 | 17 |
| Antiozonant 4: | | | |
| Initial | 1.4 | 17 | 17 |
| 1 day | 1.2 | 17 | 17 |
| 4 days | 1.2 | 17 | 17 |
| 7 days | 0.9 | 17 | 17 |
| 14 days | 0.9 | 17 | 17 |
| Antiozonant 5: | | | |
| Initial | 1.4 | 17 | 17 |
| 1 day | 1.0 | 17 | 15 |
| 4 days | 1.2 | 17 | 17 |
| 7 days | 1.0 | 17 | 17 |
| 14 days | 1.0 | 17 | 17 |

1 Control with no ozone exposure.

This example clearly demonstrates the remarkable improvement in peel tack which results from ozone exposure of the elastomer/antiozonant compositions.

EXAMPLE 4

The procedure of Example 3 is repeated except that: 2 phr. of the antiozonants shown in Table IV are employed; the amount of ozone is increased to 250 p.p.m.

TABLE IV

Antiozonant: Diester of 5-Norbornene-2-methanol and Adipic Acid

| | Peel tack (p.l.i.) | | |
|---|---|---|---|
| After— | 0-sec. $O_3$ [1] | 60-sec. $O_3$ | 120-sec. $O_3$ |
| ½ day | 1.4 | 17 | 11 |
| 1 day | 1.2 | 18 | 16 |
| 3 days | 1.0 | 18 | 18 |
| 7 days | 1.0 | 18 | 16 |
| 14 days | 1.0 | 18 | 18 |
| 30 days | 1.0 | 18 | 18 |

Antiozonant: Diester of 5-Norbornene-2-methanol and Maleic Acid

| | | | |
|---|---|---|---|
| ½ day | 1.5 | 9 | 6 |
| 1 day | 0.9 | 10 | 15 |
| 3 days | 1.0 | 18 | (2) |
| 7 days | 0.9 | 17 | 15 |
| 14 days | 1.0 | 18 | 18 |
| 30 days | 1.0 | 18 | 18 |

1 Control with no ozone exposure.
2 Not determined.

EXAMPLE 5

Carcass skim stock is made as described in Formula 1 except that: the sulfur content is lowered to 1.5 parts; stearic acid is omitted; 10 parts of Resin R' are added. This composition, is outside the scope of this invention and is used as a control for purposes of comparison. An embodiment of the present invention is made by adding 2 phr. of 1,4-di-2,4-cyclopentadien-1-yl-2-butene to this control. After 3 x 6-inch slabs have been exposed to 300 p.p.m. ozone, they are tested for peel and hold tack. Samples are aged in the dark at 25° C. Table V gives typical data.

TABLE V

|  | Exposed to 300 p.p.m. O₃ for (sec.) | Antiozonant [1] present | | Control [2] | |
| --- | --- | --- | --- | --- | --- |
|  |  | Peel tack (p.l.i.) | Hold tack (min.) | Peel tack (p.l.i.) | Hold tack (min.) |
| Newly treated surface | 10 | 12 | >600 | 13 | >600 |
|  | 30 | 11 | 0 | 13 | >600 |
|  | 60 | 9 | 0 | 10 | >600 |
| Surface aged 1 day | 10 | 9 | >600 | 1.7 | 1.4 |
|  | 30 | 11 | >600 | 13 | >600 |
|  | 60 | 11 | >600 | 15 | >600 |
| Surface aged 7 days | 10 | 16 | >600 | 1.1 | 1 |
|  | 30 | 15 | >600 | 18 | >600 |
|  | 60 | 17 | >600 | 18 | >600 |

[1] 1,4-di-2,4-cyclopentadien-1-yl-2-butene

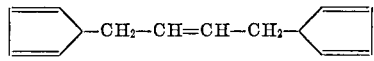

[2] Outside the scope of this invention, does not contain antiozonant.

This example demonstrates that short ozone exposure time coupled with the use of 1,4-di-2,4-cyclopentadien-1-yl-2-butene as the antiozonant, results in compositions having useful peel and hold tack with improved longevity.

EXAMPLE 6

Carcass fabrics of a butadiene/styrene copolymer (SBR-1502) is made in accordance with the general procedure hereinbefore described. The stock having the following composition.

| Component: | Parts by wt. |
| --- | --- |
| Copolymer (SBR-1501) | 100 |
| FEF carbon black | 20 |
| SRF carbon black | 15 |
| Naphthenic petroleum oil | 5 |
| ZnO | 4 |
| Stearic acid | 1 |
| N-cyclohexyl-2-benzothiazyl-sulfenamide | 1.2 |
| Sulfur | 2 |
| Antiozonant-2 (when present) | 1 |

Samples of the fabric are exposed to ozone and tested for peel tack in accordance with the procedures hereinbefore described. Results are given in Table VI. In the table, A' is antiozonant-2 as hereinbefore described and the term "elastomer" is used for the sake of convenience to indicate a sample prepared from the stock described above.

TABLE VI

| Sample | Exposed to 300 p.p.m. O₃ for (sec.) | Peel tack (p.l.i.) | | | | |
| --- | --- | --- | --- | --- | --- | --- |
|  |  | Initial | 1 day | 3 days | 7 days | 49 days |
| Elastomer | 0 | 2 | 2 | 3 | 2 | 2 |
| Elastomer plus A' | 0 | 2 | 3 | 3 | 2 | 2 |
| Elastomer | 20 | [1] 6 | 2 | 3 | 2 | 4 |
| Elastomer plus A' | 20 | [1] 5 | [1] 6 | [1] 5 | [1] 7 | [1] 6 |
| Elastomer | 60 | [1] 5 | 2 | 4 | <1 | <1 |
| Elastomer plus A' | 60 | [1] 3 | [1] 5 | [1] 5 | [1] 6 | [1] 6 |

[1] Elastomer specimen welded, pulling away from test strip backing, thus limiting measurable tack strength.

No meaningful improvement in hold tack was obtained with these butadiene/styrene samples.

EXAMPLE 7

The tests described in Examples 1-6 are conducted in accordance with the general procedures described therein but with the following modifications in procedure:

Preparation of test specimens

For testing small samples of skim stock, an elastomer coated nylon webbing is fabricated as described below. The nylon webbing is first prepared as follows: A mixture of 30 g. of Penacolite R-2170 Resin (a precondensed resorcinol-formaldehyde resin of 75% solids content from Koppers Co.), 180 ml. of 0.1 N NaOH and 18 ml. of 37% formaldehyde is aged 2 hours; 800 grams of 20% chlorosulfonated polyethylene latex is added and the resulting mixture is stirred and aged an additional one hour. This coating is then applied to the nylon webbing with a brush. The coated webbing is air-dried twelve hours before use.

Small sized samples suitable for test screening experiments are prepared from the coated nylon webbing (prepared as described above) by pressing a 6" x 3" x 0.75" sheet of elastomer carcass skim stock between the coated nylon webbing and a polyethylene terephthalate film, using a laboratory compression press with mild pressure (to embed the elastomer into the nylon webbing) at a temperature of 100° C. for 3 minutes. The terephthalate film is removed to give a test specimen similar to actual tire carcass fabric.

The following tests are used to determine the amount of tack in the elastomer samples.

Peel tack

Test strips ¼-inch wide by 6-inches long are cut from the rubber coated nylon webbing, the film is removed, and pairs are joined by placing the elastomeric surfaces together and rolling with an 8-pound weight. Thirty seconds after joining the strips they are pulled apart in a tensile testing machine at a draw rate of 2.5 inches per minute at 20-25° C. The peel strength is recorded in pounds per linear inch.

Hold tack

This method measures the tack bond in tensile loading (quick grab tack). Specimens are cut from 1" x ½" strips cut from test samples constructed as described under the Peel Test. One piece is mounted vertically on the face of a fixed metal block. The other piece is mounted horizontally across a similar block which can be driven into contact with the first block by an air activated cylinder. When the faces of the pieces are contacted, the contact force is measured by the pressure applied to the air cylinder. A contact force of 20 pounds is used. The time of contact is determined by a timing mechanism which can be set for an interval of 0.8 to 15 seconds. A contact time of one second is used followed by application of a 5-pound breaking force. The time at which the surfaces separate is recorded up to a maximum of 600 seconds as a measure of the degree of hold tack.

Activation of the carcass fabric

Samples are activated on a batchwise basis in a 12" cubical box with a hinged door in which the ozone concentration is maintained by a Welbach Model 19–T ozone generator or by a mercury vapor lamp hung 4 inches from the top of the box. Ozone concentration in the box is varied by passing dry air through an inlet and out an exit to dilute the ozone in the box to the desired range.

Ozone concentration is determined by passing a measured amount of air from the ozone chamber through KI solution and back-titrating with $Na_2S_2O_3$ to a starch end point.

The results obtained are comparable to those described in Examples 1–6.

EXAMPLE 8

Elastomer plus antiozonant are combined on a rubber mill at a temperature sufficient to melt and disperse the antiozonant. The test samples are prepared and tested as described in Example 7. The results are given in Table VII.

TABLE VII.—PEEL TEST ON UNCOMPOUNDED ELASTOMERS

| Sample | Time of ozone exposure (125 p.p.m. $O_3$), sec. | Peel tack (p.l.i.) | | |
|---|---|---|---|---|
| | | Immediately | 1 day | 1 week |
| SBR–1502 | 0 | 1.5 | 0.9 | |
| | 30 | 0.0 | 0.0 | |
| SBR–1502 plus 2 p.p.h. Antiozonant 2 | 0 | 2.6 | 4.6 | 4.2 |
| | 30 | 7.0 | 6.8 | 5.3 |
| Polybutadiene¹ | 0 | 1.0 | 1.2 | |
| | 30 | 0.0 | 0.9 | |
| Polybutadiene plus 2 p.p.h. Antiozonant 2 | 0 | 1.0 | 1.2 | 1.0 |
| | 30 | 2.45 | 2.45 | 2.6 |
| Polymer B plus 10 p.p.h. Sunpar 2280 oil | 0 | 1 | | |
| | 30 | 1 | | |
| Polymer B plus 10 p.p.h Sunpar 2280 oil plus 2 p.p.h. Antiozonant 2 | 0 | 1.5 | | |
| | 30 | 7.2 | | |

¹ "Cis-4" polybutadiene manufactured by Phillips Petroleum Company.

What is claimed is:

1. A synthetic hydrocarbon elastomer tackified by
    (a) uniformly dispersing in the elastomer about 0.1–10 parts per hundred parts of elastomer of at least one member selected from the group: elastomer soluble N,N'-disubstituted-p-arylene diamines, 1,4-di-2,4-cyclopentadien-1-yl-2-butene, a 1,2-dihydro - 2,2,4-trialkyl quinoline, and diesters of 5-norbornene-2-methanol and a dicarboxylic acid, said acid containing about 2–8 carbon atoms, and
    (b) exposing the mixture, so formed, to about 5 to about 10,000 parts ozone per million parts air or to ultraviolet light in the presence of oxygen to produce a peel tack which is at least one pound per linear inch more than the peel tack before exposure.

2. The composition of claim 1 wherein at least about 5 parts by weight of process oil per 100 parts elastomer is incorporated into the elastomer mixture.

3. The composition of claim 2 wherein at least about 5 parts by weight of reinforcing filler per 100 parts elastomer is incorporated into the elastomer mixture.

4. The composition of claim 3 wherein there is uniformly dispersed in the elastomer at least one member selected from the group: elastomer soluble N,N'-disubstituted - p - arylene diamines, 1,4-di-2,4-cyclopentadien-1-yl-2-butene; an alkoxy substituted 1,2-dihydro-2,2,4-trialkyl quinoline wherein the alkoxy contains about 1–5 carbon atoms and each alkyl contains about 1–3 carbon atoms, and diesters of 5-norbornene-2-methanol and a dicarboxylic acid, said acid containing about 2–8 carbon atoms.

5. The composition of claim 4 wherein at least one member selected from the group consisting essentially of N,N'-bis(1-ethyl-3-methylpentyl) - p - phenylenediamine, 6-ethoxy-1,2-dihydro-2,2,4-trimethylquinoline, N - isopropyl-N'-phenyl-p-phenylenediamine and a diester of 5-norbornene-2-methanol and adipic acid and a diester of 5-norbornene-2-methanol and maleic acid is dispersed in the elastomer.

6. The composition of claim 4 in which an N,N'-disubstituted p-phenylenediamine is dispersed in the elastomer.

7. The composition of claim 6 wherein the N,N-disubstituted p-phenylenediamine is the condensation product of one mole of hydroquinone with 2 moles of a mixture containing about 20–80% by weight of o-toluidine and about 80–20% mixed xylidines.

8. The composition of claim 4 containing about 0.1–2 parts antiozonant per hundred parts elastomer by weight.

9. The composition of claim 4 exposed to ozone at a concentration of about 5–500 parts ozone per million parts air for a period of about 5–120 seconds.

10. The composition of claim 4 wherein the elastomer is a polymer of ethylene and another alpha-olefin.

11. The composition of claim 10 in which the alpha-olefin is propylene.

12. The composition of claim 10 in which the elastomer is a terpolymer of ethylene, another alpha-olefin, and a non-conjugated diene having only one readily polymerizable double bond.

13. The composition of claim 12 in which the alpha-olefin is propylene and the non-conjugated diene contains about 6–22 carbon atoms.

14. The composition of claim 13 in which the elastomer is a terpolymer of ethylene/propylene/1,4-hexadiene.

15. The composition of claim 1 wherein the elastomer is a polymer of ethylene, another alpha-olefin and a non-conjugated diene having only one readily polymerizable double bond and wherein an organic cyclic resin, which is a heat insensitive phenolaldehyde resin, a terpenoid resin or an isoprenoid resin and which has at least one polar functional group and a molecular weight of at least 200 is dispersed in the elastomer.

16. The composition of claim 14 wherein about 2–10 parts by weight of an organic cyclic resin which has at least one polar functional group and a molecular weight of at least 200 and which is a terpenoid, isoprenoid or heat insensitive phenol aldehyde resin per hundred parts elastomer is dispersed in the elastomer.

17. The composition of claim 4 wherein the elastomer is a butadiene/styrene copolymer or a butadiene homopolymer.

18. The composition of claim 17 in combination with natural rubber or a polymer of ethylene/another alpha-olefin/a non-conjugated diene.

References Cited
UNITED STATES PATENTS

| 3,234,197 | 2/1966 | Baum | 260—93.7 |
| 3,410,816 | 11/1968 | Mirabile | 260—28.5 |
| 3,563,928 | 2/1971 | King | 260—19 |
| 3,565,841 | 2/1971 | Tarney | 260—27 |

JAMES A. SEIDLECK, Primary Examiner

R. S. BENJAMIN, Assistant Examiner

U.S. Cl. X.R.

260—33.6 A, 41.5 R, 45.7 R, 45.85, 45.9 R, 80.78, 88.25, 845, 846, 889, 897 A; 156—334; 204—159.18